United States Patent
Wilson, Jr.

(10) Patent No.: US 7,212,917 B2
(45) Date of Patent: May 1, 2007

(54) TRACKING, RELAY, AND CONTROL INFORMATION FLOW ANALYSIS PROCESS FOR INFORMATION-BASED SYSTEMS

(75) Inventor: Robert C. Wilson, Jr., Covington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/955,579

(22) Filed: Sep. 30, 2004

(65) Prior Publication Data

US 2006/0069497 A1 Mar. 30, 2006

(51) Int. Cl.
*G08B 29/00* (2006.01)
*G08G 7/00* (2006.01)

(52) U.S. Cl. .................. 701/120; 342/32; 340/961
(58) Field of Classification Search .............. 701/120, 701/213, 301, 200, 303, 207, 214; 342/29, 342/32, 64, 65; 340/961, 947, 945, 948
See application file for complete search history.

(56) References Cited

U.S. PATENT DOCUMENTS

| | | | | |
|---|---|---|---|---|
| 5,058,024 A | * | 10/1991 | Inselberg | .................... 701/301 |
| 6,085,147 A | * | 7/2000 | Myers | ........................ 701/209 |
| 6,493,609 B2 | * | 12/2002 | Johnson | ........................ 701/3 |
| 6,552,669 B2 | * | 4/2003 | Simon et al. | ............... 340/945 |
| 6,675,095 B1 | * | 1/2004 | Bird et al. | ................... 701/301 |
| 6,795,772 B2 | * | 9/2004 | Lin et al. | ..................... 701/301 |
| 6,873,903 B2 | * | 3/2005 | Baiada et al. | ............... 701/120 |
| 6,885,313 B2 | * | 4/2005 | Selk et al. | ................... 340/945 |

* cited by examiner

*Primary Examiner*—Dalena Tran
(74) *Attorney, Agent, or Firm*—Lee & Hayes, PLLC

(57) ABSTRACT

Methods and apparatus for controlling movement of aircraft through a defined air space are disclosed. In one embodiment, a method includes generating a model of the defined air space. The model is configured to indicate a safe subset of the defined air space for movement. Receiving a trajectory datum from an aircraft facilitates placing the aircraft at an aircraft position in the generated model of the defined air space according to the trajectory datum. A route is generated for the aircraft through the defined air space according to the aircraft position and the safe subset. Control commands are transmitted to the aircraft; the control commands are configured to control the aircraft according to the route.

80 Claims, 6 Drawing Sheets

TRACKING, RELAY, AND CONTROL INFORMATION FLOW ANALYSIS PROCESS FOR INFORMATION-BASED SYSTEMS

FIELD OF THE INVENTION

This invention relates generally to air traffic control and, more specifically, to automation of air traffic control.

BACKGROUND OF THE INVENTION

Controlling assets through a defined space is a task that has both civilian and military uses. In a most common situation, air traffic control may involve moving commercial airplanes through airspace. Air traffic control has, in common with tasking military assets, the coordinated movement of multiple assets through a crowded space filled with terrain, weather, and other obstructions.

The U.S. Air Traffic Control or ATC system is heavily burdened. In the first nine months of 2000, for example, one in four aircraft in the National Airspace System (NAS) found itself plagued by system delays averaging 50 minutes per aircraft and affecting 119 million people. The ATC system is under heavy demand, particularly along the east coast. This demand has grown steadily the past few decades. For example, air carrier departures in 1999 rose 12% over departures logged in 1994. Air traffic has grown more than 2.5 times since 1974.

The current U.S. Air Traffic Control System includes 20 Air Route Traffic Control Centers or "Centers" that are the largest ATC facilities interacting directly with the aircraft. Each Center is responsible for the safety and efficient transit of aircraft through their assigned segment of the airspace. Controllers at the Centers communicate with individual aircraft that are generally at high altitudes or away from major airports. The Terminal Radar Approach Control (TRACON) facilities house controllers that are responsible for the airspace within approximately 40 miles of major airports. Towers are responsible for approaches and departures of aircraft as well as taxiing at a specific airport.

Air traffic control relies heavily upon verbal communications between controller and pilot. In tactical communications between the controller and all of the pilots within the controller's airspace, only a single VHF channel is available for communications. Due to the number of communications that must occur between the controller and the pilots and the poor quality of the communication channel, it is critical for the communications to exhibit a clear intent spoken expeditiously.

To date, there has been little ability to improve the viability of verbal air traffic control. One such improvement to the controlling of aircraft in the airspace has included FAA & the International Civil Aviation Organization (ICAO) honing the language used in verbal communications to such an extent that there exists an ICAO standard phraseology requiring timely feedback, thereby minimizing ambiguity about the sender's true intent. This standard phraseology has also improved the speed with which the sender communicates. Nonetheless, the incremental improvements in speed achieved by these measures has not been sufficient to deal with the ever-mounting control load.

Communication is also important to the Traffic Management Coordinators within a facility. Though not directly influencing the safety of a particular aircraft, inadequate or misleading communications may lead dozens of aircraft along inefficient paths. The aircraft's routing decisions may arise from miscommunication between ATC, the flight crew, or the airline, or from the fact that one party was lacking a critical piece of information. If the full content of the message is communicated using the wrong vocabulary or notation (the message is poorly encoded), then the message's intent is lost. The message must also be sent in a timely fashion. If the message is sent too late, then the content of the message is lost, no matter how accurately it is transmitted.

Additionally, ATC controllers make decisions about routing without knowledge of flight capabilities of aircraft, fuel state, or aircraft attitude. Controllers propose flight paths by selecting from predefined flight paths chosen to suitably match the flight characteristics common to the least capable of likely aircraft to use the space. Thus, where high performance aircraft occupy a space in proximity to lower performance aircraft, separations are selected to rule out the likelihood of interference in spite of the great disparity in performance. Packing the airspace in this manner fails to exploit the space available where performances are more closely matched.

What is needed is a method, system, and software product to more efficiently pack a three-dimensioned airspace with flight paths chosen to exploit the space efficiently.

SUMMARY OF THE INVENTION

A method, system, and computer program is configured for controlling movement of aircraft through a defined air space. In one embodiment, a method includes generating a model of the defined air space. The model is configured to indicate a safe subset of the defined air space for movement. Receiving a trajectory datum from an aircraft facilitates placing the aircraft at an aircraft position in the generated model of the defined air space according to the trajectory datum. A route is generated for the aircraft through the defined air space according to the aircraft position and the safe subset. Control Commands are transmitted to the aircraft; the control commands are configured to control the aircraft according to the route.

The present invention also comprises a method, system, and computer program for receiving an encrypted trajectory datum and decrypting the encrypted trajectory datum to extract a trajectory datum. The method, system, and computer program for receiving the trajectory datum includes the ability to extract a time stamp indicative of a time for which the trajectory datum is valid.

In accordance with further aspects of the invention, the system, method and computer program are configured to select a frequency and a modulation scheme configured to communicate with the aircraft according to ambient conditions. Ambient conditions include such impediments to communication as weather (specifically the water vapor attenuating properties), existing radio frequency traffic, and aircraft proximity to an available ground station configured to send and to receive on a particular frequency and according to a particular modulation scheme.

In accordance with other aspects of the invention, the aircraft position may be generated according to traditional coordinates, i.e. latitude, longitude, and altitude. A further variable is assigned to indicate a position confidence level. The confidence level is a function of such as vertical dilution of position and horizontal position. Confidence is also a function of a Kalman filter operating on radar returns from the airspace.

In accordance with still further aspects of the invention, the received trajectory datum includes other information indicative of the vehicle status. The vehicle status includes such information as the power state of the aircraft, the power state meaning the throttle setting; an attitude, the attitude including yaw, pitch, and roll angles; a fuel state; and a radio altimetry height.

In accordance with yet other aspects of the invention, the trajectory datum is also advantageously configured to include an aircraft identification code. The aircraft identification code allows a ground station to retrieve from a database some identification of the airframe performance characteristics of the aircraft according to its make, model, and equipment.

In accordance with still another aspect of the invention, the trajectory datum may advantageously include an intended flight plan. The intended flight plan allows the controller to choose an advantageous flight path for movement of the aircraft through the airspace. Additionally, the intended flight plan facilitates prioritizing the several aircraft in the defined airspace to resolve conflicts in projected tracks through the airspace.

The invention provides for generating a model of the airspace to derive a subset of the airspace for safe routing of the aircraft through the defined airspace. Generating the model of the airspace includes tracking other aircraft through the space, generating weather data in the space, and excluding from the airspace terrain and restrictions on the airspace.

BRIEF DESCRIPTION OF THE DRAWINGS

Preferred and alternative embodiments of the present invention are described in detail below with reference to the following drawings.

DETAILED DESCRIPTION

The present invention relates to controlling aircraft traveling through an airspace. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description.

By way of overview, a method, system, and computer program are configured for controlling movement of aircraft through the defined air space. In one embodiment, a method includes generating a model of the defined air space. The model is configured to indicate a safe subset of the defined air space for movement. Receiving a trajectory datum from an aircraft facilitates placing the aircraft at an aircraft position in the generated model of the defined air space according to the trajectory datum. A route is generated for the aircraft through the defined air space according to the aircraft position and the safe subset. Control Commands are transmitted to the aircraft; the control commands are configured to control the aircraft according to the route.

Figure 1:
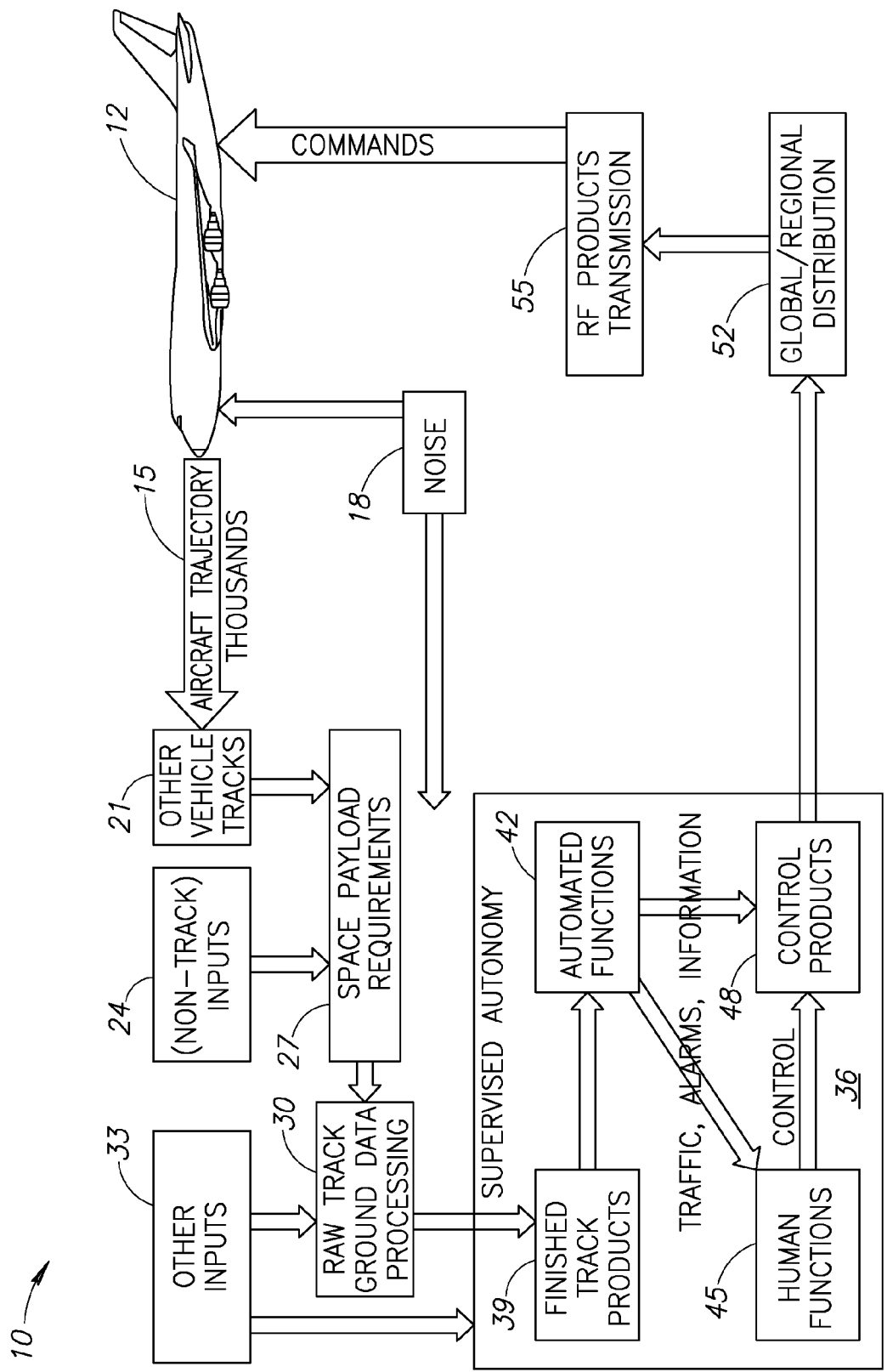
FIG. 1 is a block diagram of a system for air traffic control.

Referring to FIG. 1, a system 10 for controlling an aircraft 12, or a multiplicity of aircraft 12, through an airspace derives routes, in part, on trajectory data 15 transmitted by the aircraft 12 from its onboard avionics. Trajectory data 15 includes such information as a GPS navigational fix indicative of a position and altitude. Optional additional data includes attitude, power state, aircraft type, laden weight, fuel load and other operational data. The trajectory data is selected to well define the performance and location state of the aircraft as it operates in the airspace. This data allows predictive discernment of the an aircraft's current course through the airspace. Trajectory data may also include some portion of a flight plan associated with the aircraft.

Trajectory data is not limited to GPS navigational information. Any of radio altimetry information, Loran fixation information, or terrain-based fixation may suitably augment the trajectory information to provide more complete agreement on the navigational position, speed, heading, and altitude on the aircraft 12. All suitable on-board navigational fixation means can be used for determining the position of the aircraft 12 in the airspace.

On board the aircraft 12, a data word is formulated to describe the instantaneous trajectory data 15 along with a time-stamp that uniquely identifies the time the trajectory data 15 is captured. Additionally, an identifier is assigned to the aircraft 12. In the presently preferred embodiment, the unique identifier is "hardwired" or permanently assigned to the aircraft 12. Alternatively, a temporary identifier is assigned as a part of a "handshake" transaction as the data word is transmitted by radio to a Space Payload Requirements Center 27. By either means or by a hybrid process of identification, the Space Payload Requirements Center 27 begins a track assigned to the aircraft 12.

The data word received at the Space Payload Requirements Center 27 may be degraded by atmospheric noise 18. Atmospheric noise 18 can interfere with such radio-dependent avionics as a GPS receiver or a radio altimeter. Such noise prevents resolution of a "tight" navigational solution for inclusion in trajectory data 15.

The Space Payload Requirements Center 27 compiles trajectory information 15 from the aircraft 12 in question as well as trajectory information or tracks 21 from the numerous other aircraft that may occupy the airspace. Additionally, non-track information 24 such as weather and terrain information augments a "big picture" view of the airspace to fully define all of the various hazards that the aircraft 12 must avoid as it transits the airspace.

Notably, the Space Payload Requirements Center 27 is not necessarily a distinct location geographically from other assets in the system; rather, it is a node for collecting the "big picture" information that may not, itself have all of its elements co-located at a single place in space. It is only necessary that at some point, the trajectory data 15 from the aircraft 12 is joined with all of the other trajectory data garnered from aircraft in the airspace and also united with the weather and terrain data to give the anticipated construction of the "big picture" of the whole of the occupied airspace. As used here, man-made objects, and in the military case, threat objects such as surface-to-air missile sites are treated as either having trajectories based upon radar tracks, in the case of airborne objects, or as terrain data being themselves navigational limitations on the air space.

The trajectory information 15 as received at the Space Payload Requirements Center 27 and augmented by at least the weather and terrain information is then compared to radar returns and other information held at various databases on the ground. For instance, raw tracking data 30 is the output of one or several ground tracking radar stations that give a returns based second "big picture" view of the airspace. Like the aircraft 12-centric views generated by compiling the trajectory data 15, the return data is time stamped to give it temporal meaning when compared to the trajectory data 15.

The trajectory data 15 received from the Space Payload Requirements Center 27 are "hardened up" with the ground-based data 24 from the various radar tracks to ascribe to each trajectory data 15 a certainty of position. Thus, instead of a single point in space, each track is represented in the trajectory data 15 as an envelope that within an accepted probability contains the aircraft 12. In most operational instances, the accuracy of the onboard trajectory data 15 will agree well with the radar raw tracking data 30 thereby allowing very tight packing of trajectory envelopes. Where there is a significant deviation, ground resources can be tasked with more specific inquiry; for instance, a backup radar in estimated proximity to the aircraft 12 can be directed to give a better resolution of the track of a particular aircraft. With this type of priority-based redundancy, fewer radar assets are dedicated to the task of resolving each position in space, rather the backups only take on the hard cases as indicated by less workable trajectory data 15 agreement with ground track data 30. Once suitable resolution of all of the trajectory data 15 for all of the aircraft 12 in the space is derived, the "live action big picture" is suitably formulated.

Additionally, more data are added to the "live action big picture" to give a fully workable model of the airspace. Databases in computers on the ground will augment the picture with additional information just as weather return and terrain data were added to it at the Space Payload Requirements Center 27, to give the "live action big picture" all of the data necessary to describe the occupation of the airspace. For instance, the performance characteristics of each of the aircraft 12 in the airspace are added to the trajectory data 15 for each of the aircraft 12 to suitably predict the ability of the aircraft 12 to maneuver in the airspace. Recalling that the fuel state, aircraft attitude and power states, and other relevant performance data as well as desired destination or mission data from the aircraft were already included in the trajectory data 15 before it left the aircraft 12, the "live action big picture" includes trajectory data 15 that can be realistically used to predict probability and desirability of any aircraft 12 to reach a second location in the airspace from its current first location. With such probabilities for each of the aircraft 12 within the airspace, efficient and coordinated control of the aircraft is possible.

Not all of the aircraft 12 in the airspace will be able or willing to make the complete disclosure of operation information comparable to trajectory data 15 received from commercial aircraft 12 on flights through the airspace. For instance, light general aviation aircraft will not have suitable avionics to transmit all of the trajectory data that would be ideal for control in the airspace. Additionally, military aircraft on missions may not be suitably able to disclose the trajectory data 15 without compromise to the security of the mission. In such instances, the ground-based data 33 and radar tracks 30 are used to define the trajectory data 15 in the airspace. In operation, there will be a continuum of completeness of trajectory data 15 and the raw track ground data processing 30 will be suitably employed to augment the data to pass off a suitably precise and accurate "live action big picture" to a controlling authority 36.

A controlling authority 36 is assigned to each defined airspace (airspaces are configured to tile a defined space; ideally the defined space might be the surface of the earth or some subset). For each defined airspace, the controlling authority 36 will operate under a protocol of supervised autonomy: supervised in that the controlling is coordinated so that there are no mid-air disasters at the boundaries of the airspace, and autonomous in that the controlling authority will route all aircraft within the airspace.

The controlling authority 36 is an analogue to the Air Route Traffic Control Centers. Rather than mere radar returns and squawks from transponders on the aircraft, the "live action big picture" sent to controlling authority 36 is sufficiently detailed to project the aircraft through the airspace while efficiently packing the airspace with proposed routes for the aircraft 12.

The controlling authority 36 includes automated assets and human assets but unlike the Air Route Traffic Control Centers, the human assets are only used in instances where the automated assets require resolution of control issues relating to needs that distinguish a given aircraft from the trajectory data the "live action big picture" contains. It is one object of the invention to move the air traffic controller to a "big picture" understanding of the whole of the airspace. This big picture is generated by allowing the automated assets to fully appraise the human assets of the whole of the space and to project alternative routes to aid the human asset in the suitably routing of the aircraft through the airspace. Additionally, the automated assets will suitable reroute the remaining aircraft in the airspace based upon the human asset routing decisions.

The automated assets include the receiving processor 39 configured to receive, compile, and display the "live action big picture" for both the human assets 45 and the computer controller 42. In most instances, the computer controller 42 will receive the compiled "live action big picture" and will project routes through the airspace based upon each aircraft 12 and the trajectory data 15 as augmented associated with the aircraft 12. It is the controller 42 that, for example, will form up trains of aircraft of similar performance and destination data through the airspace in sequence, thereby minimizing assigned flight separation distances allowing the very tight packing of the airspace. Even where the controller 42 forms trains of aircraft of dissimilar performance characteristics in the airspace, the controller 42 has the ability to find safe median flight profiles through the space that will fall squarely within the operational envelope of the dissimilar aircraft for safe and expedient passage through the airspace. Additionally, the controller 42 may optionally assign flight directional biases corresponding to ordinal points on a compass to aircraft at a given altitude thereby allowing flow through the space analogous to lamina in a flow model. Strategies for efficient packing may vary according to parameters designated by the FAA or other authority but the controller 42 accomplishes more coordinated routing of aircraft through the airspace.

Either of two instances will cause the engagement of the human assets 45 for routing. First, an aircraft 15 may trigger engagement of the human assets either by a pilot in charge requesting the assistance or by erratic movement through the airspace. In either instance, human communication with the pilot in charge is necessary to resolve a route for the aircraft. Second, the controller 42 may request resolution of a route based upon competing solutions for the routing of one or more aircraft. Because of the display generated by the processor 39 configured to receive the "live action big picture" and alarms generated in the automatic functions processor 42, the human asset 45 may choose to intervene at any moment that the human asset's 45 judgment demands it. In an extreme situation, for instance, an emergency response will be routed to a human asset 45, if only for monitoring the decisions of the controller 42 in the course of performance of the controlling tasks. The controller 42 remains ready to modify routing of other aircraft 12 in accord with the decisions of the human 45.

Whether purely the product of the controller 42, or the controller 42 operating in concert with the human asset 45, routes are constructed to efficiently pack the airspace according to the parameters designated. The routes are sent to the control products processor 48 to generate appropriate air traffic control instructions for each aircraft 12 in the airspace. Generally, these will be digital words much like those generated by the avionics in the aircraft 12 to convey the trajectory data 15. In other instances, controller data can optionally be sent as verbal transmissions by air traffic controllers (not pictured) in direct communication, for instance, at a TRACON (not pictured) suitably located for communication with the aircraft. Additionally, an appropriate subset of the "live action big picture" can be provided to aircraft and those aircraft make their own decisions within predetermined limits.

In the instance of digital words formulated at the control product processor 48, the digital words are sent to the distribution center 52 for networked transmission to a transmission site 55 located to optimally communicate with the aircraft 12 in much the same manner as selecting a TRACON (not pictured) for verbal air traffic control. In either manner, the commands derived according to the system 10 are communicated either, in the case of the digital words, directly to the avionics on board the aircraft 12 or verbally to the pilot in charge of the aircraft 12.

Figure 2:
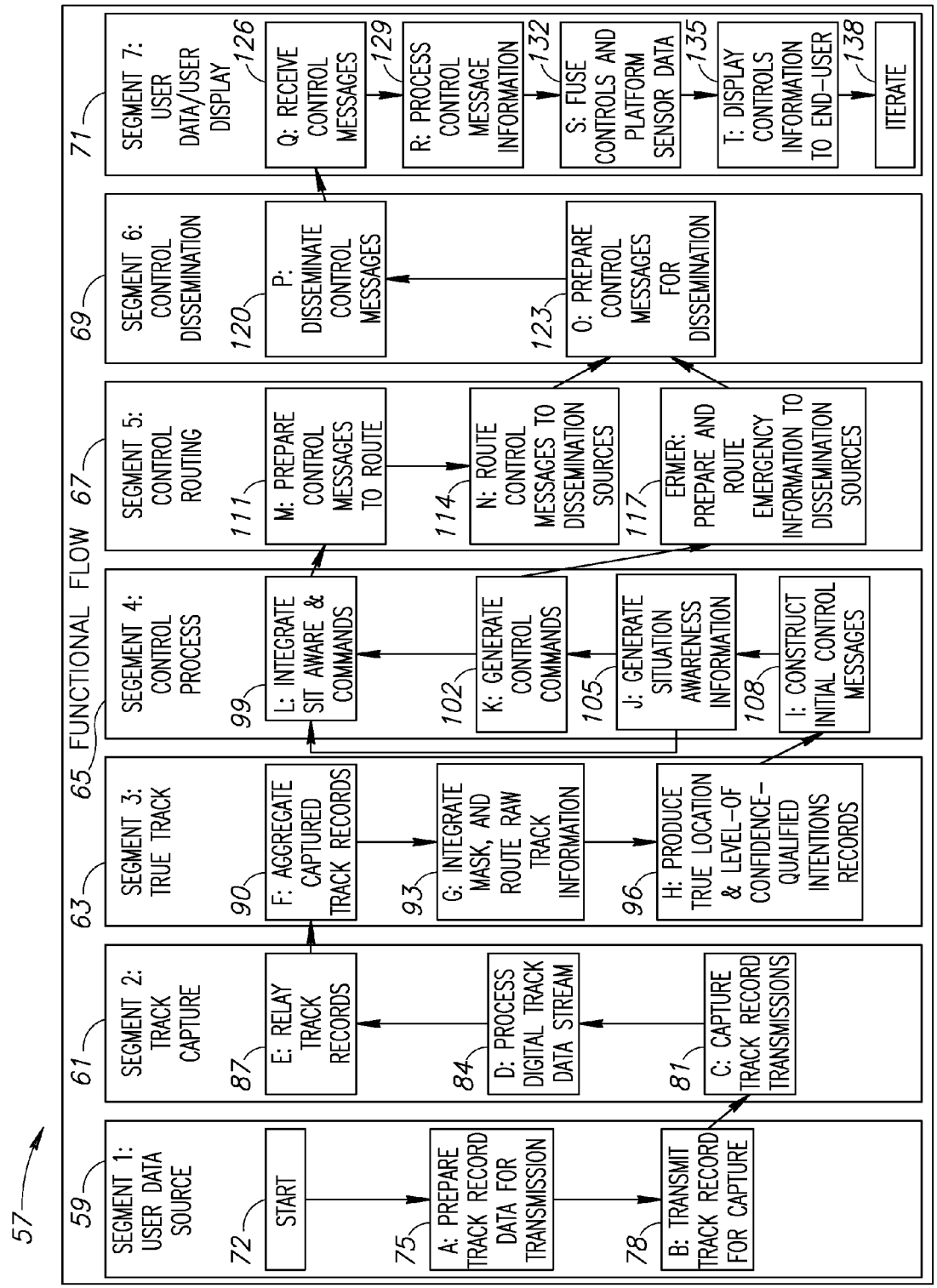
FIG. 2 is a flow chart of a method for digital air traffic control.

Referring to FIGS. 1 and 2, the system 10 controls aircraft 12 by performing a segmented method 57. The method 57 is segmented to exploit relationships between tasks and recognized constraints on any air traffic control system. It is important to note, that while the segments may be performed in distinct locales, the choice of segmentation is for functional and not for physical or locational purposes. A first segment 59 is chosen to include steps that are necessarily produced on the aircraft 12 including monitoring the navigational position, the power state, and identity of the aircraft. Additionally, the first segment 59 includes transmission of the track record for capture. A second segment 61 is configured to receive the transmission and to relay it to the Space Payload Requirements Center 27. At the Space Payload Requirements Center 27, a third segment 63 includes comparing the received tracks and integrating the tracks into track envelopes that include probabilities of precise and accurate positioning.

A fourth segment 65 defines the control process 57 as it occurs at the controlling authority 36. The the fourth segment 65 is configured to compile the control instructions necessary to route the aircraft 12 through the airspace. At a fifth segment 67, the instructions to the aircraft 12 are compiled for distribution to an optimal transmission site. Distribution and transmission occurs at a sixth segment 69. Again, on board the aircraft 12, the seventh and final segment 71, includes the receipt and response to the transmitted control instructions. The other key users in the final segment 71 are the controller and higher level decision makers.

On board the aircraft 12, the first segment 59 is commenced at a Start 72 generally occurring at power-up of the avionics. Upon power-up, the avionics are aware of the identity of the aircraft. Currently, avionics are wired into aircraft 12, either at construction of the aircraft 12 or as a result of a permanent installation, and therefore, while not necessary for operation of the system, generally, an identity code will be "hardwired" into the avionics and that identity code will be entered into a database for access by the system to determine the design performance characteristics of the aircraft 12. Upon power-up, the avionics, at a block 75, survey the aircraft to determine as many of the navigational and performance variables as may be sensed in the aircraft 12. These navigation and performance data are compiled into an extended trajectory data word based upon a template including fields for each of the sensed data.

The trajectory data 15 may include such information as a GPS navigational fix indicative of a position and altitude. Optional additional data includes attitude, power state, aircraft type, laden weight, fuel load and other operational data. Once the trajectory data 15 is compiled, the trajectory data 15 is relayed for transmission at a block 78 to a ground antenna while a next trajectory data 15 is first sensed, then compiled. On the aircraft, the avionics are tasked with continual compiling and transmitting of trajectory data much as a conventional transponder is configured for continual "squawking" of an identity code. At the block 78, on board the aircraft 12, the instantaneous trajectory data 15 along with a time stamp that uniquely identifies the time the trajectory data 15 is captured is transmitted to the ground antenna.

On the ground, in the air, or in space in the second segment 61, the antenna receives the transmitted trajectory data 15 at a block 81. At a block 84, the captured trajectory data is aggregated with other words preparatory to sending the information to a ground site. Every bit of information sent in the data word is preferably protected with error detection encoding to permit the detection of errors induced by noise. Once detected, the receiver may ask for a retransmission of the erroneous bits, or to stand fast and await the subsequent transmission as the current transmission is detected as corrupt. In a binary channel, error-checking codes are known as parity check codes. Once reconstructed, the information is relayed at a block 87 for the purposes of sending all words to the ground site. placing the track relative to others in the airspace.

In the transition from the second segment 61 to the third segment 63, the system shifts its focus from the individual aircraft in the airspace to the whole of the airspace. It is in the fourth segment that the method 57 defines the airspace and inserts each of the routing envelopes for each of the aircraft 12 in the airspace. Because each aircraft 12 enters the airspace at distinct moments, at a block 90, new tracks are added as the existing tracks are further refined. At the block 90, the captured tracks are collected for entry into the defined airspace.

At a block 93, the tracks are constructed from the aggregated list into the defined space in order to appropriately analyze the whole of the airspace and to compare separations in real time. Construction includes placement of the trajectory data and all navigation and power state data in database representing a time-corrected three-dimensioned model of the airspace with aircraft 12. This time-corrected model is providing the baseline for comparison with radar returns is assembled in the block 108 (FIG. 1). Optionally, the airspace is also defined to include terrain elevation and restrictions on the airspace that diminish the "flyable" space in the airspace.

At a block 96, the digital words are converted word into meaningful information about the position, condition, and power state of the aircraft 12 and associating the information with a track for the aircraft 12 through the airspace. Additionally, radar returns from all radars available to the system in the airspace are compared with the time-corrected model of the airspace in order to accurately place each of the tracks with relation to the ground-based radars and such other mobile radars as are in the area capable of sensing the airspace. In one presently preferred embodiment, each of the word-based tracks are compared to the radar returns or other sensor information (e.g., infrared, electro-optical) by means of a suitably configured particle filter to yield a "true" track and a level of confidence associated with the "true" track in order to place the tracks in the space. A single 'true track' per vehicle is passed generated for further processing. The time corrected model of the airspace is now definable (done in block 108).

In most instances, tracks existing in the space, existed and were controlled prior to the present iteration of the method 57. Because the tracks are relatively static when compared to the iteration frequency, i.e. even the fastest aircraft move according to a continuous generally smooth curve through the airspace, most of the control messages will be consistent with the last control messages sent. Because of the static nature of most of the tracks, most of the controlling commands need little adjustment in any one iteration.

At a block 105, situational awareness is added to the space. Situational awareness includes such matters as weather instances, turbulence or detected wind shear instances, and terrain elevation and flight restriction data (if terrain elevation and flight restriction data have not optionally been added at the block 93), as well as any non-aircraft traffic in the airspace, such as dense flocks of birds.

Only for the control command instructions that require change, at a block 102, new instructions specifically addressed to the unique aircraft 12 according to their unique identifiers. Because many of the aircraft 12 do not require new control commands, the processing overhead on the controller 42 is diminished. For those aircraft 12 requiring distinct control commands according to the designated parameters, control commands are formulated and compiled.

In the standard operation of the system, at the Block 102, the controller 42 deconflicts trajectories and prevents congestion by doing forward-projection of paths based on the particle filter projection done earlier. The deconflicting function significantly increases safety during flight by controlling trajectories to avoid over-congestion in any airspace at the least, and at the worst, identifying potential collisions, whether possible or imminent.

In the event of an emergency such as a hijacking or operational failure of systems on an aircraft 12, parameters for air traffic control may shift. For instance, in an operational failure such as engine failure, separation parameters may be greatly enlarged to address the emergency. In the event of an emergency, the aircraft in question will receive priority in routing at the block 102 according to the specific parameters that are set out for the situation that caused the declaration of an emergency and then are granted priority in routing at a block 117 as discussed in greater depth below.

For purposes of declaring an emergency, the system, due to its better situational awareness and discernment of positions of aircraft in the airspace may be declared not only by the declaration by either the Pilot in Charge or the Air Traffic Controller in verbal communication, but also by simply having the aircraft 12 deviate significantly or erratically from the control commanded route. Anticipating the movement of the aircraft through space is readily facilitated given the model of the airspace formed at the block 108.

At a block 99, control commands are assembled for transmission into the airspace according to the unique aircraft identifiers. Optionally, all of the situational awareness data set forth in relation to block 105 may be added to suitably included fields in the compiled control commands. By this means, upon receipt, pilots in charge of aircraft 12 receive a fuller picture of situation awareness data than can be discerned from reference solely to onboard instrumentation.

At a block 111, leaving the fourth segment 65 and entering the fifth segment 67, as the focus of the method 57 transitions from generating control commands to disseminating the generated commands to appropriate transmission sites and according to modes selected. In one presently preferred embodiment, the selection of suitable sites for transmission to the aircraft may be selected according to any suitable means to reach the aircraft 12. Rather than to limit transmissions to the existing control frequencies for radio transmission, one inventive aspect of the invention is to exploit frequencies freed from oral, transponder, and other tasks and introducing a frequency agile network for transmission of control commands to the aircraft 12. For instance, if, due to radio traffic or atmospheric conditions, one of frequencies conventionally assigned to air traffic control is inaccessible, the system will search among the various available frequencies and modulation schemes to find a means of suitably communicating with the aircraft 12. Another example is movement from one geographic region to another in which previously allowable frequencies can no longer be used.

At the block 111, for each aircraft 12 in the airspace, one or more optimal sites, frequency, and modulation schemes are selected and associated with the aircraft 12, though the method 57 will allow for dynamic changing of the optimal site, frequency, and modulation scheme based upon system 10 requirements, atmospheric conditions, and radio traffic. Additionally each receiving or transmitting site may have its transmission parameters changed based on forecasted location needs or changes in status of the aircraft. Where, at the block 117, an emergency routing occurs, the system 10 assigns resources according to the remaining resources after the emergency routing occurs.

At a block 114, the non-emergency control messages are routed to the appropriate dissemination sources for transmission.

At a block 123, the control command messages are prepared for transmission to the aircraft 12. Preparation optionally includes reformatting messages with error detection encoding suitable for the modulation scheme and frequency designated for transmission. Additionally, situation awareness data, if they have not been added to the control commands is optionally added to the control messages at this point. At a block 120, the control commands as prepared are transmitted to the aircraft 12.

The method moves from the sixth segment 69 to the seventh segment 71 as the performance of the method shifts from the ground to on board the aircraft 12, at a block 126, as the control commands are received. At a block 129, the data is stripped from the received messages and route them within the aircraft 12 to the suitable avionics.

In the presently preferred embodiment, the protocol for handling malformed commands is distinct from a normal 'network' protocol where malformed commands or responses are simply ignored, thus the protocol is known as a 'denial of service' model. The presently preferred embodiment addresses questionable or almost certainly incorrect commands, or data received from vehicles, as containing invaluable data. Therefore, where possible, even malformed commands are received and corrected based upon past known good data. Such good data may be supplemented with results from specialized queries to receive new data on an expedited basis or piecemeal basis. In some cases, it will be advantageous to employ a different encryption or layout of data for these piecemeal data transmissions.

At a block 132, the data are used to control the aircraft. In the presently preferred embodiment, these data immediately evoke control responses from onboard avionics. At a block 135, the method 57, includes formulating the information for display to the pilot in charge, either through an enunciator such as a display, alarm, voice announcement, or by means of specific instruction sets sent to the pilot in command by iconic displays. As has been evident in the discussion above, this and each segment iterates at a block 138 suitably to allow the parallel processing of each segment in the method.

Figure 3:
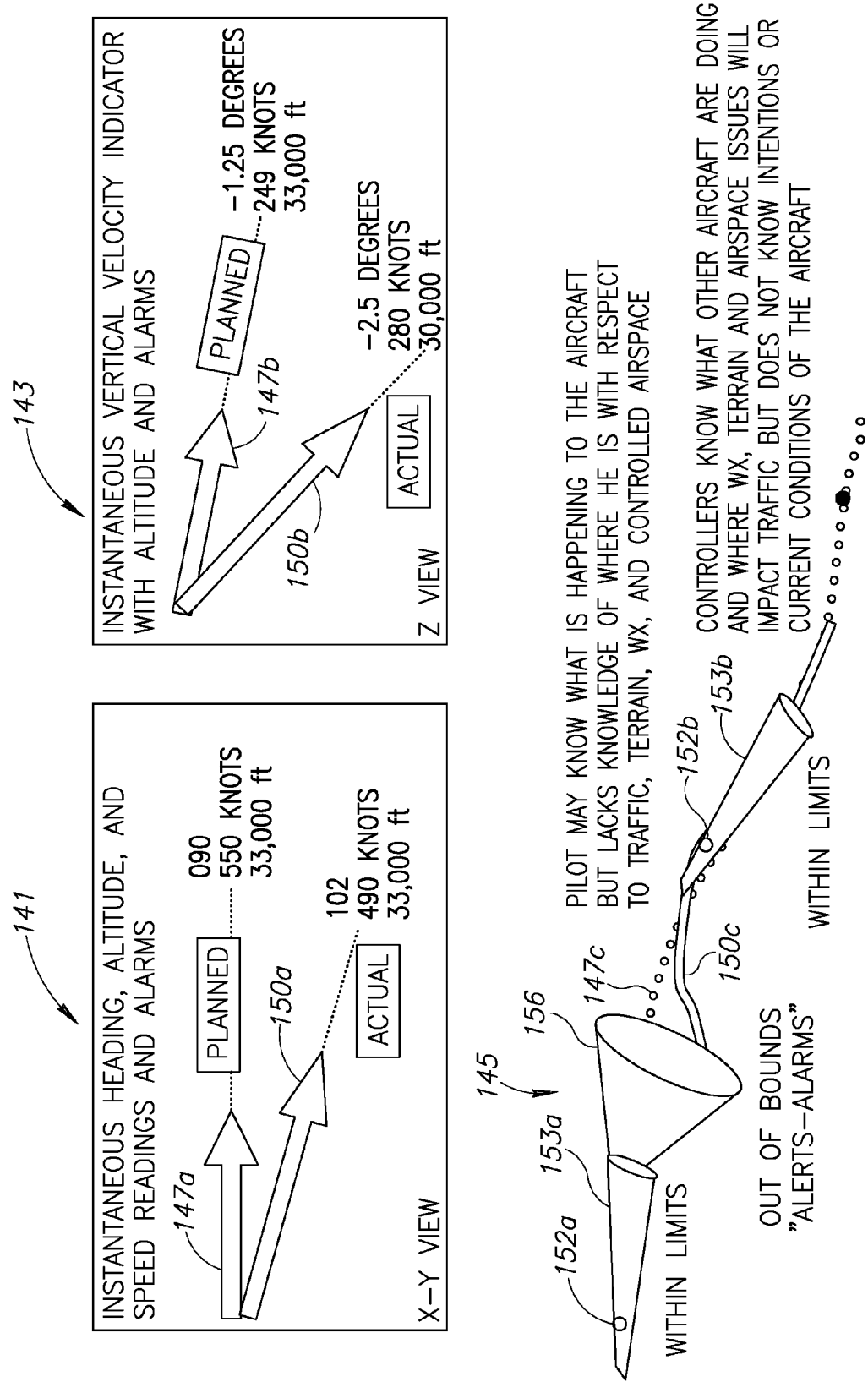
FIG. 3 is comparison of a projected path with an actual path for automated control decisions.

As indicated in the discussion above with regard to the block 102, an emergency may be triggered by other than mere verbal notification. Referring to FIG. 3, a first instance 141 of deviation from a control commanded path 147a for an aircraft 12 (FIG. 1) is shown for triggering alarms and a possible determination of an emergency. Based upon displacement from the control commanded path 147a, where an actual path 150a is significantly outside of a selected range from the commanded path. As indicated, where at an altitude of 33,000 ft. the system 10 (FIG. 1) can discern a measurable difference from a true path having a heading of 102 at a speed of 490 knots and how it deviates significantly from the filed or commanded path having a heading of 90 or due east, at 550 knots.

Similarly, in a second instance 143, the system 10 (FIG. 1) can discern a deviation such as a drop in altitude as readily as a deviation in direction. For instance, where a commanded downward movement 147b is executed at the significantly faster speed of 280 knots and a depressed downward path of 2.5 degrees rather the commanded 1.25 degrees.

To show the operation of parametric emergency cones in three-dimensioned instance 145, the presently preferred embodiment defines cones 153a and 153b of tolerance around a commanded path 147c. At a first point 152a in flight, a tolerance cone 153a is projected based upon the commanded path 147c. When the actual path 150c, is within the cone 153a, no action, such as alarms are triggered, as "within limits." At a second point, the actual path 150c deviates not only outside a second tolerance cone (not pictured) but also outside of an emergency cone 156. The maneuver causing the actual path 150c to exceed even the emergency cone 156 thereby causing a state of emergency. In accord with lesser deviations exceeding only the tolerance cone (not shown) a cautionary alert may occur which may be any of several means of alerting the human asset 45 (FIG. 1) including bringing a display analogous to that portraying the three-dimensioned instance 145. According to parameters designated, the alerting action may persist even once at a point 152b where the actual path 150c returns to within the tolerance cone 153b.

Figure 4:
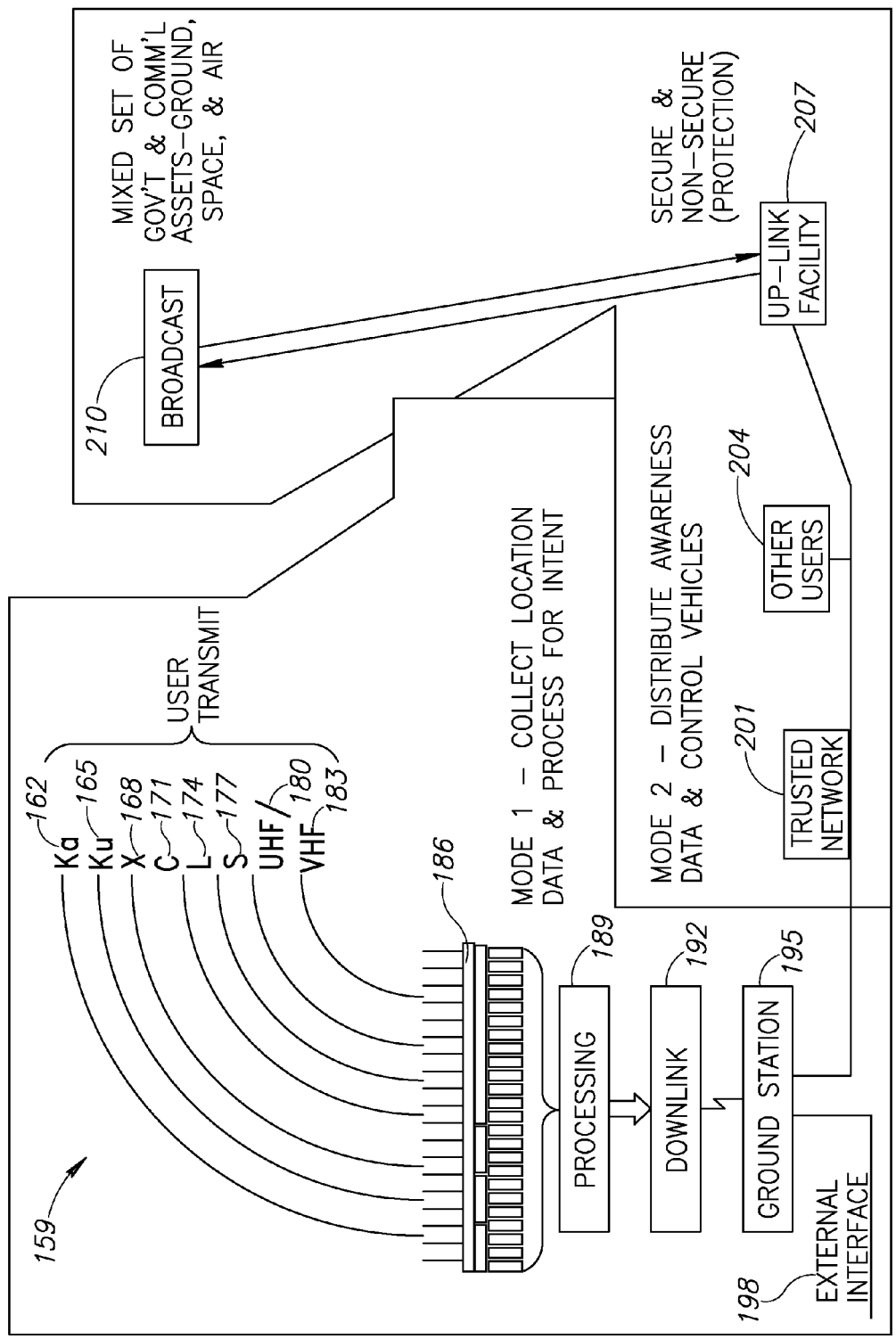
FIG. 4 is signal flow chart for a communications loop for air traffic control.

An aircraft 12 (FIG. 1) has many entry portals for information from ground or from satellites. Referring to FIG. 4, typical electromagnetic receptivity 159 for a standard commercial aircraft is shown as an amalgamation of frequencies available for communication. Each of the frequencies is associated with a modulation scheme for placing information on a band. In the inventive system, one optional way of utilizing all of the frequencies available to the aircraft relies on the use of identification codes to differentiate control commands from other radio traffic rather than to rely upon the traditional dedication of frequencies to certain functions. Conventionally, the purpose of a message determined the frequency and the modulation scheme used to transmit the signal. In the inventive system, any of the several frequencies available on the aircraft 12 (FIG. 1).

The $K_a$ band (kurtz-above band) 162 is a portion of the K band of the microwave band of the electromagnetic spectrum. The $K_a$ band 162 roughly ranges from 18 to 40 GHz. The 20 to 30 GHz band is used in communications satellites downlink. The K band 165 is a portion of the electromagnetic spectrum in the microwave range of frequencies ranging between 12 to 40 GHz. The K comes from kurtz (German: short). K band (not shown) between 18 and 26.5 GHz, is absorbed easily by water vapor ($H_2O$ having a resonance peak at 22.24 GHz, 1.35 cm). The $K_u$ band 165 ranges from 11 to 18 GHz and is used for satellite communications especially for satellite backhauls from remote locations to network studios for editing and broadcasting. The $K_u$ band 165 is can be affected by rain attenuation.

The X band 168 of the microwave portion of the electromagnetic spectrum roughly ranges from 5.2–10.9 GHz. The X band 168 is dedicated to some communications satellites and to X-band radar. C band 171 or "compromise" band is used primarily for 3.7–4.2 GHz employing horizontal polarization and less affected by rain attenuation than the K bands 162, 165. The L band 174 is known, as well as the 20 cm radar long band and ranges 0.39 to 1.55 GHz. The L band 174 is reserved by law to the U.S. military for telemetry. GPS uses the L band 174. The S-band 177 or 10 cm radar short band is used by weather radar and some communications satellites. S-band 177 range in frequency from 1.55 to 5.2 GHz.

Ultra high frequency (UHF) 180 radio frequencies are those between 300 MHz and 3.0 GHz, which is higher than those of very high frequency (VHF) 183. UHF 180 and VHF 183 are the most common frequency bands for television. UHF 180 frequencies have higher attenuation from atmospheric moisture and benefit less from "bounce" or the reflection of signals off the ionosphere back to earth, when compared to VHF 183 frequencies. In most countries, the VHF 183 spectrum, because of its more localized broadcast properties, is used for broadcast audio and television, as well as commercial two-way radios (such as that operated by taxis and police), marine two-way audio communications, and aircraft radios.

In the inventive system 10 (FIG. 1), the system is capable of nimble selection from one band and modulation scheme to another due to several aspects of the transmission and reception scheme. The transmissions are generally data words of finite length and specific form, having fields within the data word dedicated to transmission of specific parameters, trajectory data, or controlling commands thereby allowing short duration burst transmissions of data in discrete words. Using handshake procedures allows for a first handshake and first data transmission on a first frequency with a first modulation scheme followed by a handshake and second data transmission on a second frequency with a second modulation scheme. Further, in certain circumstances (e.g., emergency of any type), the inventive system may transmit the identical message on multiple frequencies with varied modulation schemes in order to assure receipt of that message.

At a database 186 of selected best sites, frequency and modulation, ground stations 195 that are a part of the network, a particular ground station 195 is selected. The selection of the ground station 195 determines whether the frequency will be selected from such frequencies as are commonly used, for example the $K_a$ 162, $K_u$ 165, the X 168, the C 171, the L 174, the S or either of UHF 180 or VHF 183 bands for transmission. Those skilled in the art will readily apprehend that any available frequency is a frequency also available for data transmission or reception, freeing the system from the assignment of frequencies based upon the content of the transmission. Once selected, the data word is processed at a processor on board the aircraft 12 (FIG. 1) for transmission at a transmission downlink antenna 192 chosen in accord with the band selected for transmission. Ground stations 195, suitably monitor the segments of the transmission spectrum assigned for information complying with the data word format. Where suitably formatted information arrives, at the ground station 195, the received data word is used to generate control commands as set forth above with respect to the fourth segment 65 (FIG. 2). Once commands are suitably formulated, the formulating including selecting the best frequency and modulation scheme, as well as the most suitable up-link facility 207 for transmission, the formulated commands are sent from the control ground station 195 over the trusted network 201 to the selected up-link facility 207 and optionally to other users 204. The up-link facility 207 then transmits to the aircraft 12 (FIG. 1) by means of the broadcast antenna 210.

Figure 5:
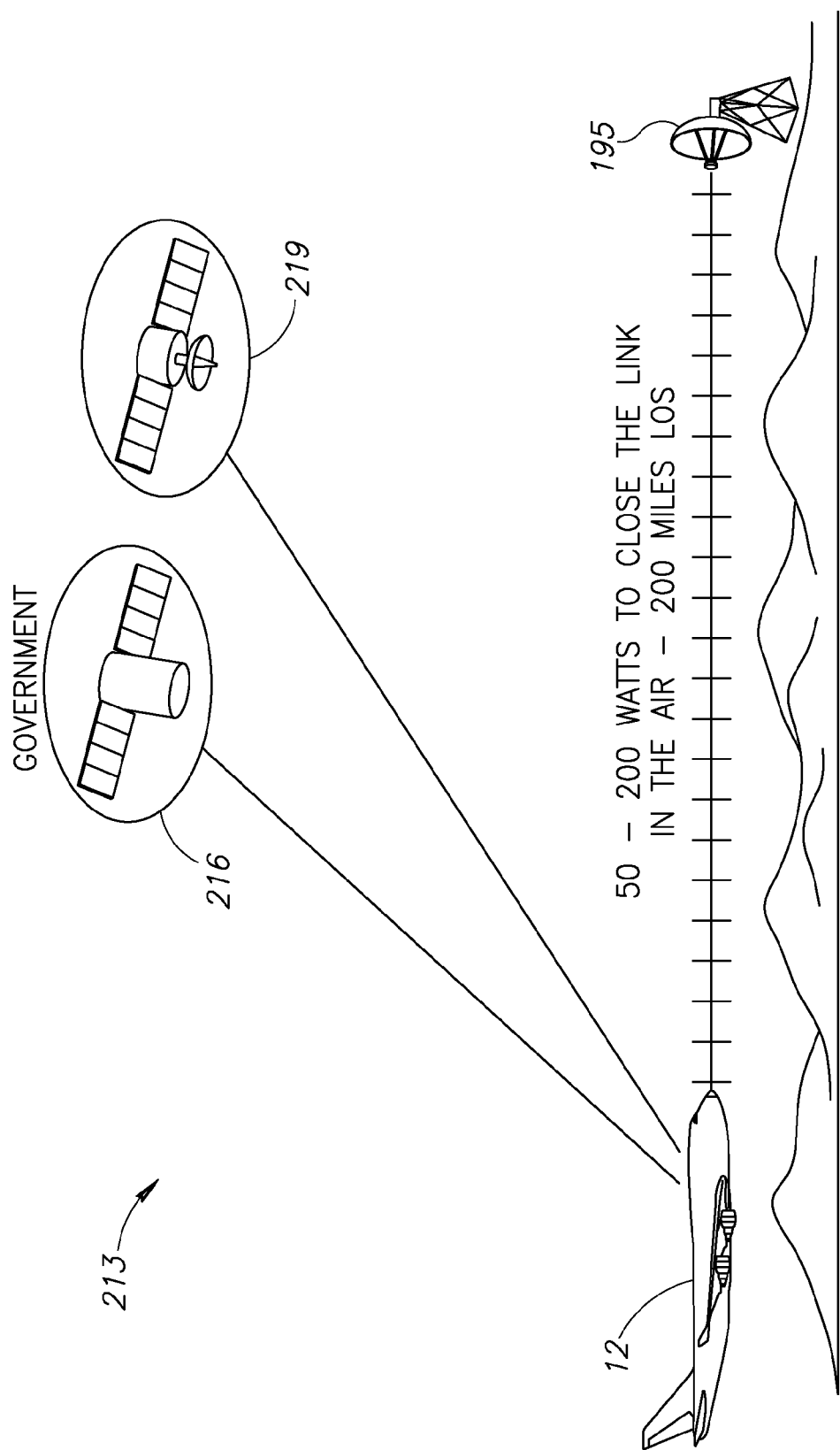
FIG. 5 is a detail view of transmitting and receiving communications for air traffic control.
Figure 6:
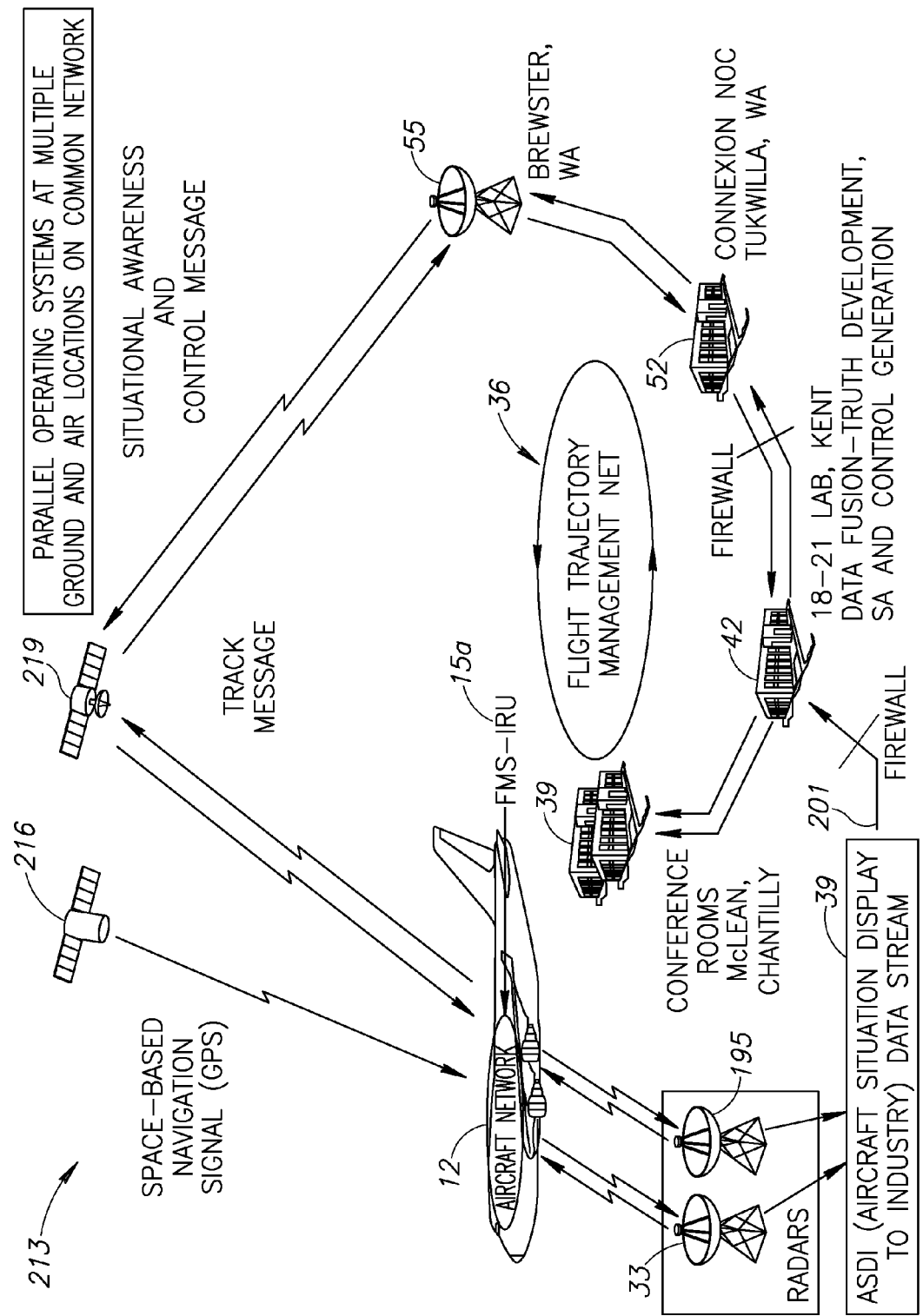
FIG. 6 is a signal flow chart for an exemplary embodiment of the air traffic control system.

Referring to FIG. 5, in the presently preferred embodiment, the communications system on board and the handshaking protocol allows for alternate use of transmission and receiving communications links between the aircraft 12 and government satellites 216, commercial satellites 219, or ground-based stations 195. Referring to FIG. 6, an exemplary use of the control loop 213 starts and ends at the aircraft 12. On the aircraft 12, the flight management system 15a exploiting inertial referencing units and receiving signals from GPS satellites is capable of formulating a navigational fix. After suitably adding the airspeed, power state, attitude, fuel state, destination, estimated time of arrival and tail number or designated identifier of air carrier and general aviation aircraft, the formulated data is sent as trajectory data to the ground station downlink facility 195 for compilation into a full airspace projection at the receiving processor 39 configured to receive, compile, and display the "live action big picture" for both the human assets 45 and the computer controller 42.

Over the secure network 201, the trajectory data 15 is passed to the controlling authority 36, specifically, the computer controller 42 will receive the compiled "live action big picture" and will project routes through the airspace based upon each aircraft 12 and the trajectory data 15. This occurs at the block 102 (FIG. 2). The human assets 39 will monitor and review the generated displays of the control status. At the computer controller 42, the control commands are sent to the distribution center 52 for networked transmission to a transmission site 55 located to optimally communicate with the aircraft 12. Rather than necessarily using the same route the trajectory information took to reach the aircraft 12, the optimal choice is determined to be a link to the aircraft 12 including a commercial satellite 219. The commercial satellite, in turn, relays the control commands to the aircraft 12 for execution thereby commanding the aircraft through the airspace.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A method for controlling movement of an aircraft through a defined air space, the method comprising:
   generating a model of the defined air space, the model configured to indicate a safe subset space of the defined air space for movement;
   receiving a trajectory datum from an aircraft;
   placing the aircraft at an aircraft position in the generated model of the defined air space according to the trajectory datum;
   generating the safe subset space based at least partially on the trajectory datum;
   generating a route for the aircraft through the defined air space according to the aircraft position and the safe subset space; and
   transmitting control commands to the aircraft, the control commands configured to control the aircraft according to at least one of the route and the safe subset space.

2. The method of claim 1, wherein generating the safe subset space includes generating at least one tolerance cone projecting forwardly from the aircraft.

3. The method of claim 1, wherein generating the safe subset space includes generating a first tolerance cone defining a within limits operation of the aircraft, and generating a second tolerance cone defining an out-of-bounds operation of the aircraft.

4. The method of claim 1, wherein receiving a trajectory datum includes receiving a trajectory datum carried at a carrier frequency and according to a modulation scheme, the carrier frequency and modulation scheme being selected according to ambient conditions.

5. The method of claim 4, wherein the ambient conditions include at least one of:
   water vapor in the airspace;
   radio traffic on available carrier frequencies; and
   aircraft proximity to an available ground station configured to send and receive radio messages according to a designated carrier frequency and a designated modulation scheme.

6. The method of claim 1, wherein the aircraft position includes at least one of latitude, longitude, elevation, time, and a confidence level.

7. The method of claim 6, wherein the aircraft position confidence level includes defining an envelope with a probability of location at or exceeding a 95% confidence level.

8. The method of claim 1, wherein the trajectory datum includes a vehicle status.

9. The method of claim 8, wherein the vehicle status includes at least one of:
   a power state;
   an attitude, the attitude including yaw, pitch, and roll angles;
   a fuel state; and
   a radio altimetry height.

10. The method of claim 1, wherein the trajectory datum includes an identification code, the identification code being suitably selected to identify the aircraft.

11. The method of claim 10, wherein the identification code is sufficient to allow retrieval of performance characteristics from an airframe database.

12. The method of claim 1, wherein placing the aircraft includes:
ascribing a level of confidence to the aircraft position from based upon correlation of the received trajectory datum to information from external information sources.

13. The method of claim 12, wherein the external information includes radar returns received at a ground station.

14. The method of claim 1, wherein receiving the trajectory datum includes receiving identification of a mission.

15. The method of claim 14, wherein receiving the identification of a mission includes receiving a destination.

16. The method of claim 14, wherein the trajectory datum includes an intended flight plan.

17. The method of claim 16, wherein the intended flight plan includes a landing site in the airspace.

18. The method of claim 1, wherein generating the model of the airspace includes generating positions of non-controlled aircraft present in the airspace.

19. The method of claim 18, wherein generating the position of non-controlled aircraft present in the airspace includes generating a probable track through the airspace.

20. The method of claim 19, wherein generating the model of the airspace includes the removing space from the subset according to the probable track.

21. The method of claim 1, wherein generating the model of the airspace includes generating a display of the model.

22. The method of claim 21, wherein generating the model of the airspace includes generating situational awareness tracks within the airspace.

23. The method of claim 22, wherein generating the model of the airspace situational awareness tracks includes removing space from the subset according to weather information.

24. The method of claim 22, wherein generating the model of the airspace situational awareness tracks includes removing space from the subset according to at least one of terrain information, airspace control issues, and received other aircraft trajectory data.

25. The method of claim 1, wherein transmitting includes encrypting control commands.

26. The method of claim 1, wherein generating the route includes a human controller selecting a route.

27. The method of claim 1, wherein receiving includes decrypting.

28. A system for controlling movement of a plurality of aircraft through a defined air space, the method comprising:
a model generator configured to generate a model of the defined air space, the model configured to indicate a safe subset space of the defined air space for movement;
a receiver configured to receive a trajectory datum from the plurality of aircraft;
a processor configured to place each of the aircraft at an aircraft position in the generated model of the defined air space according to the trajectory datum;
a subset generator configured to generate the safe subset space based at least partially on the trajectory datum;
a router configured to generate a route for each of the aircraft through the defined air space according to the aircraft position and the safe subset space; and
a transmitter configured to transmit control commands to each of the aircraft, the control commands configured to control each of the aircraft according to at least one of the route and the safe subset space.

29. The system of claim 28, wherein the subset generator is further configured to generate the safe subset space including at least one tolerance cone projecting forwardly from the aircraft.

30. The system of claim 29, wherein the subset generator is further configured to generate the safe subset space including a first tolerance cone defining a within limits operation of the aircraft, and a second tolerance cone defining an out-of-bounds operation of the aircraft.

31. The system of claim 29, wherein the receiver includes a frequency nimble processor configured to receive a trajectory datum carried at a carrier frequency and according to a modulation scheme, the carrier frequency and modulation scheme being selected according to ambient conditions.

32. The system of claim 31, wherein the ambient conditions include at least one of:
water vapor in the airspace;
radio traffic on available carrier frequencies; and
aircraft proximity to an available ground station configured to send and receive radio messages according to a designated carrier frequency and a designated modulation scheme.

33. The system of claim 29, wherein the trajectory datum includes a vehicle status.

34. The system of claim 33, wherein the vehicle status includes at least one of:
a power state;
an attitude, the attitude including yaw, pitch, and roll angles;
a fuel state; and
a radio altimetry height.

35. The system of claim 28, wherein the aircraft position includes at least one of latitude, longitude, elevation, time, and a confidence level.

36. The system of claim 35, wherein the aircraft position confidence level includes defining an envelope with a probability of location at or exceeding a 950% confidence level.

37. The system of claim 28, wherein the trajectory datum includes an identification code, the identification code being suitably selected to identify the aircraft.

38. The system of claim 37, wherein the identification code is sufficient to allow retrieval of performance characteristics from an airframe database.

39. The system of claim 28, wherein the processor configured to place the aircraft includes:
means for ascribing a level of confidence to the aircraft position from based upon correlation of the received trajectory datum to information from external information sources.

40. The system of claim 39, wherein the external information includes radar returns received at a ground station.

41. The system of claim 28, wherein the receiver configured to receive the trajectory datum includes being configured to receive data to identify the aircraft mission.

42. The system of claim 41, wherein the data to identify the aircraft mission includes identifying a destination.

43. The system of claim 42, wherein the trajectory datum includes an intended flight plan.

44. The system of claim 43, wherein the intended flight plan includes a landing site in the airspace.

45. The system of claim 28, wherein the model generator includes a position generator to generate positions of non-controlled aircraft present in the airspace.

46. The system of claim 45, wherein to generate the position of non-controlled aircraft present in the airspace includes assigning a probable track through the airspace.

47. The system of claim 46, wherein to generate the position of non-controlled aircraft includes removing space from the subset according to the probable track.

48. The system of claim 28, wherein to generate the model of the airspace includes generating a display of the model.

49. The system of claim 48, wherein to generate the model of the airspace includes generating situational awareness tracks within the airspace.

50. The system of claim 48, wherein to generate the model of the airspace situational awareness tracks includes removing space from the subset according to at least one of weather information, terrain information, airspace control issues, other aircraft trajectory data.

51. The system of claim 48, wherein to generate the route includes assigning priorities to other aircraft in the airspace according to received.

52. The system of claim 28, wherein the transmitter includes an encrypter for encrypting control commands.

53. The system of claim 28, wherein to generate the route includes a human controller selecting a route.

54. The system of claim 28, wherein the receiver includes a decrypter for decrypting the trajectory datum.

55. A computer program stored on a computer-readable medium, the program configured for controlling movement of an aircraft through a defined air space, comprising:
    a model generator script configured to generate a model of the defined air space, the model configured to indicate a safe subset space of the defined air space for movement;
    a receiver script configured to receive a trajectory datum from an aircraft;
    a processor script configured to place the aircraft at an aircraft position in the generated model of the defined air space according to the trajectory datum;
    a subset generator script configured to generate the safe subset space based at least partially on the trajectory datum;
    a router script configured to generate a route for the aircraft through the defined air space according to the aircraft position and the safe subset space; and
    a transmitter script configured to compile transmittable control commands to an avionics system the aircraft, the control commands configured to evoke an automated response from the avionics system to control the aircraft according to at least one of the route and the safe subset space.

56. The program of claim 55, wherein the subset generator is script further configured to generate the safe subset space including at least one tolerance cone projecting forwardly from the aircraft.

57. The program of claim 56, wherein the trajectory datum includes a vehicle status.

58. The program of claim 57, wherein the vehicle status includes at least one of:
    a power state;
    an attitude, the attitude including yaw, pitch, and roll angles;
    a fuel state; and
    a radio altimetry height.

59. The program of claim 58, wherein the trajectory datum includes an identification code, the identification code being suitably selected to identify the aircraft.

60. The program of claim 59, wherein the identification code is sufficient to allow retrieval of performance characteristics from an airframe database.

61. The program of claim 59, wherein processor script configured to place the aircraft includes:
    means for ascribing a level of confidence to the aircraft position from based upon correlation of the received trajectory datum to information from external information sources.

62. The program of claim 61, wherein the external information includes radar returns received at a ground station.

63. The program of claim 55, wherein subset generator script is further configured to generate the safe subset space including a first tolerance cone defining a within limits operation of the aircraft, and a second tolerance cone defining an out-of-bounds operation of the aircraft.

64. The program of claim 55, wherein the receiver script includes a frequency script configured to select a carrier frequency and a modulation scheme to receive a trajectory datum according to ambient conditions.

65. The program of claim 64, wherein ambient conditions include at least one of:
    water vapor in the airspace;
    radio traffic on available carrier frequencies; and
    aircraft proximity to an available ground station configured to send and receive radio messages according to a designated carrier frequency and a designated modulation scheme.

66. The program of claim 64, wherein the aircraft position includes latitude, longitude, elevation, time, and a confidence level.

67. The program of claim 66, wherein the aircraft position confidence level includes defining an envelope with a probability of location at or exceeding a 95% confidence level.

68. The program of claim 55, wherein the receiver script configured to receive the trajectory datum includes being configured to receive data to identify the aircraft mission.

69. The program of claim 68, wherein the data to identify the aircraft mission includes identifying a destination.

70. The program of claim 69, wherein the trajectory datum includes an intended flight plan.

71. The program of claim 70, wherein the intended flight plan includes a landing site in the airspace.

72. The program of claim 55, wherein the model generator script includes a position generator script to generate positions of non-controlled aircraft present in the airspace.

73. The program of claim 72, wherein to generate the position of non-controlled aircraft present in the airspace includes assigning a probable track through the airspace.

74. The program of claim 73, wherein to generate the position of non-controlled aircraft includes removing space from the subset according to the probable track.

75. The program of claim 74, wherein to generate the model of the airspace includes generating a display of the model.

76. The program of claim 74, wherein to generate the model of the airspace includes generating situational awareness tracks within the airspace.

77. The program of claim 74, wherein to generate the model of the airspace situational awareness tracks includes removing space from the subset according to at least one of weather information, terrain information, airspace control issues, and received other aircraft trajectory data.

78. The program of claim 55, wherein the transmitter script includes an encrypter for encrypting control commands.

79. The program of claim 55, wherein to generate the route includes a human controller selecting a route.

80. The program of claim 55, wherein the receiver script includes a decrypter for decrypting the trajectory datum.

* * * * *